United States Patent [19]
Woerner

[11] 3,973,842
[45] Aug. 10, 1976

[54] MAGAZINE FOR SLIDES FOR THE SIMULTANEOUS PROJECTION OF PICTURES AND REPRODUCTION OF SOUND

[75] Inventor: Hans Woerner, Calmbach, Black Forest, Germany

[73] Assignee: Pronton-Werk Alfred Gauthier GmbH, Wildbad, Germany

[22] Filed: Mar. 10, 1975

[21] Appl. No.: 556,619

Related U.S. Application Data

[63] Continuation of Ser. No. 383,114, July 27, 1973, abandoned.

[30] Foreign Application Priority Data
July 29, 1972 Germany............................ 2237390

[52] U.S. Cl. ........................... 353/19; 353/120; 360/2; 360/132
[51] Int. Cl.² ................ G03B 31/06; G11B 25/04; G11B 23/02
[58] Field of Search .................. 353/15, 16, 17, 18, 353/19, 120; 360/2, 132

[56] References Cited
UNITED STATES PATENTS

| | | | |
|---|---|---|---|
| 3,176,580 | 4/1965 | Metz .................................. | 353/120 |
| 3,238,842 | 3/1966 | Wiklund et al. ..................... | 353/120 |
| 3,296,925 | 1/1967 | Yamamoto ......................... | 353/120 |
| 3,504,133 | 3/1970 | Bellis ................................. | 360/75 |
| 3,526,454 | 9/1970 | Gerry ................................. | 353/19 |

FOREIGN PATENTS OR APPLICATIONS

| | | | |
|---|---|---|---|
| 1,295,876 | 5/1969 | Germany ............................ | 353/15 |

Primary Examiner—Richard E. Aegerter
Assistant Examiner—Steven L. Stephan
Attorney, Agent, or Firm—Arthur A. March

[57] ABSTRACT

This invention relates to camera apparatus having a mechanism containing transparent slides for projection, and, with this, there is provided a mechanism for including with these slides related sound records for reproduction concurrently with the pictorial representations.

15 Claims, 14 Drawing Figures

MAGAZINE FOR SLIDES FOR THE SIMULTANEOUS PROJECTION OF PICTURES AND REPRODUCTION OF SOUND

This is a continuation of application Ser. No. 383,114 filed July 27, 1973 and now abandoned.

DESCRIPTION OF THE INVENTION

Manufacturers of diapositives (transparencies or slides) and users of apparatus for showing them have always had a need to combine such slides with sound recordings. In the absence of devices suitable for this purpose a tape recorder and a timing device for the synchronous operation of the above two devices were originally used for giving a picture and sound performance, and these were located adjacent to the actual image projecting device. It will be understood that such a combination of devices, quite apart from the high initial cost, requires too many manipulations involving the risk of incorrect operation. In recognition of the disadvantages of this combination of devices, a system comprising a fitted timing device for the reproduction of pictures and sound has already been provided which certainly demands fewer manipulations by the user, but the cost price of which must still be considered is considerable.

The object of the present invention is to provide design and manufacture, a magazine for slides and associated sound, and also an inexpensive projector which is suitable for the use thereof and ensures reliable projection of the slides in the magazine, and reproduction of the associated sound recordings.

According to the present invention there is provided a magazine for diapositives (transparent slides) for the simultaneous projection of pictures and reproduction of sound, wherein the magazine is provided with a single displaceably guided sound carrier formed as an endless tape and having at least as many sound tracks as the magazine has compartments for receiving slides.

In a preferred embodiment of the magazine proposed in accordance with the present invention, the sound carrier is guided parallel to the direction of movement of the magazine. This ensures that, with a minimum of additional space requirement by the sound carrier, a sound track can be associated with each slide, the carrier having recording capacity greater than that of similar known sound carriers.

The present invention also proposes that the sound carrier which may be accommodated in a closed chamber is located on one side wall of the container receiving the slides to form a structural unit together with said container. An oblong core formed in the receiving chamber may be used for guiding the sound carrier. Alternatively, the strip-like sound carrier may be guided on rollers mounted to rotate in the receiving chamber.

As an alternative, the chamber receiving the sound carrier is formed as a separate part which is subsequently assembled to form a unit with the container in which the slides are stacked. Such an arrangement makes is possible to prepare simple and cheap injection moulds for making the individual parts of the machine, which may be made from plastics material by injection moulding.

In a preferred embodiment of the present invention, ensuring both reliable operation of the sound carrier and simple guidance of the sound head, the outer longitudinal side wall of the sound carrier chamber is provided with slot-like openings extending transversely to the direction of movement of the sound carrier and exposing a portion of said sound carrier for frictional engagement with a feed roller and a sound head.

In order to provide a compact design of magazine for holding slides, it is possible, according to a further proposal of the present invention, for the chamber receiving the sound carrier simultaneously also to receive the slide container and for the sound carrier to be guided around the side walls of the container. This arrangement is used in cases where it is important to associate with each slide a particularly long sound track, this being possible since the sound carrier is guided by its periphery around the relatively large slide container. The sound carrier may also be guided on rollers provided at the corners of the container. Additional simplification in construction may be achieved with such an embodiment if the container forms a guide web and end pieces having a semi-circular cross section are provided at both ends.

According to a further feature of the present invention it is proposed, in order to obtain a method of operation free of breakdowns in a projection and sound reproducing apparatus for magazines of the above-described construction that, in addition to the apparatus effecting the stepping of the magazine and the feeding of the slide in the region of the screen, an accessory assembly be used which has a feed roller provided with a motor drive, and a sound head guided displaceably transversely to the direction of movement of the sound carrier and controlled in dependence on the step-by step advance of the magazine. Smooth operation of this device is ensured by providing a control member on the assembly for relative displacement of the sound head transversely to the direction of the movement of the magazine, the control member producing an automatic displacement of the sound head with respect to the adjacent sound track dependently on the particular control step effecting the feed of the slide. The control member may include a stationary cam provided with an edge rising at an incline in the direction of movement of the magazine.

In order to ensure simple manipulation of the projection and sound reproduction apparatus, the accessory assembly may be laterally deflected when a magazine is inserted, with automatic return to a starting position when an adequate operating position of the magazine is reached.

In order to prevent breakdowns due to the omission of an operating step, the present invention also provides means for the automatic coupling and uncoupling of the magazine with the accessory assembly. A spring-loaded pressure pin on the assembly and a notch serving to receive the pressure pin may be provided as such means. Finally, according to a further feature of the present invention, an indicator may be used giving information concerning the passage of the magazine, said device giving the operator numerical information of the slide located in the beam of the projector.

Details of the invention are shown in the accompanying drawings, in which.

With reference to the drawings, a container is indicated by 1a, the inner walls of which are provided with partitions arranged parallel to each other for the formation of compartments for receiving diapositives or slides. As shown by the embodiment in FIG. 1, the container 1a, designed as a magazine, is also provided with a chamber-like portion 1b in which a core 3 serving to guide a sound carrier 2 is inserted. In order to achieve the most compact design possible of the magazine, the sound carrier 2 is formed as an endless belt and the core 3 as an elongated structure to fit into the inner space of the chamber. The shape of the core 3, which is provided with round edges 3a at opposite ends, is such that the direction of movement of the tape 2, indicated by the arrow, extends parallel to the direction of feed or movement of the magazine 1. However, a direction of movement transverse to the feed direction of the magazine is also possible. The core 3 may be connected rigidly to the bottom of the chamber 1b, or detachably to provide the possibility of interchanging the assembly of core and tape for another assembly. The latter possibility, however, presumes the provision of a removable cover closing the chamber 1b of the sound carrier. In order to reproduce sounds corresponding to all the slides received in the magazine 1, a width of tape is provided which allows for the provision of as many sound tracks as there are compartments in the magazine.

Figures 1, 2, 3, 4:
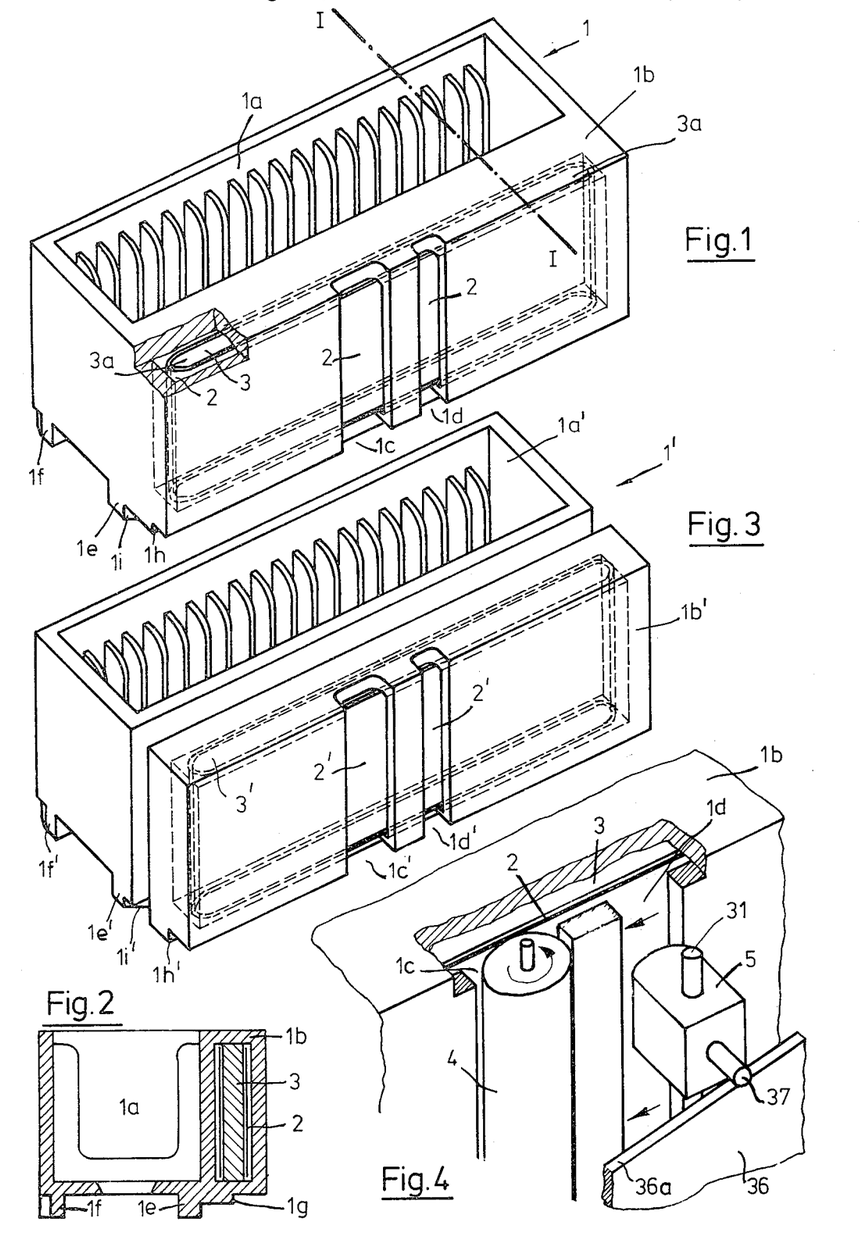
FIG. 1 shows a perspective view of an embodiment of a magazine for diapositives or slides, with a sound carrier.
FIG. 2 shows a cross-section through the magazine taken on the line I—I in FIG. 1.
FIG. 3 shows such an embodiment of a magazine the sound carrier of which is a separate unit from the slide carrier.
FIG. 4 is a partial view of the magazine, showing a feed roller for the drive of the sound carrier, and a sound head.

As may also be seen from FIG. 1, the outer longitudinal side wall of the magazine 1 enclosing the sound carrier 2 is provided with slot-like openings 1c and 1d, extending over the entire width of the tape, so as to expose a portion of the sound carrier 2 accommodated in the chamber 1b in order to bring into frictional contact therewith, as shown in FIG. 4, a feed roller 4 and a sound head 5 displaceably guided transversely to the longitudinal direction of said sound carrier. The core 3, serving to guide the tape and provided with a smooth surface, provides the counter-pressure necessary for achieving the frictional engagement between the sound carrier 2 and feed roller 4. The core 3 may be provided with a covering of felt (not shown) near the slot-like openings 1c and 1d for the purpose of avoiding unnecessary stressing of the sound carrier 2. This covering of felt ensures a gentle sliding motion of the sound carrier 2, loaded by the roller and sound head 5, on the core 3, and reduces the sliding resistance.

If it appears advisable from the point of view of manufacture, it is possible, as shown in FIG. 3, for the container 1a' to be made of plastics material, and constructed as a separate part, and to provide a separate part 1b' forming a chamber for receiving the sound carrier 2'. These two parts 1a' and 1b' may be joined together at the end of the manufacturing process either by means of a mechanical connecting means, or by means of a suitable adhesive.

Thus a magazine 1' (FIG. 2) is obtained which corresponds from the point of view of structure and equipment, to the magazine 1 shown in FIG. 1. Both magazines are provided with asymmetrically located guide ledges 1e and 1f and 1e' and 1f'. The object of this asymmetrical arrangement is to ensure that the magazine is always correctly inserted in the picture and sound reproducing apparatus. One of the above-mentioned guide ledges is provided with teeth for the continued feed of the magazine 1 when inserted in the guide channel of the projection apparatus, said teeth engaging with a driving pinion, described hereinafter, when the magazine is inserted.

Figure 5:
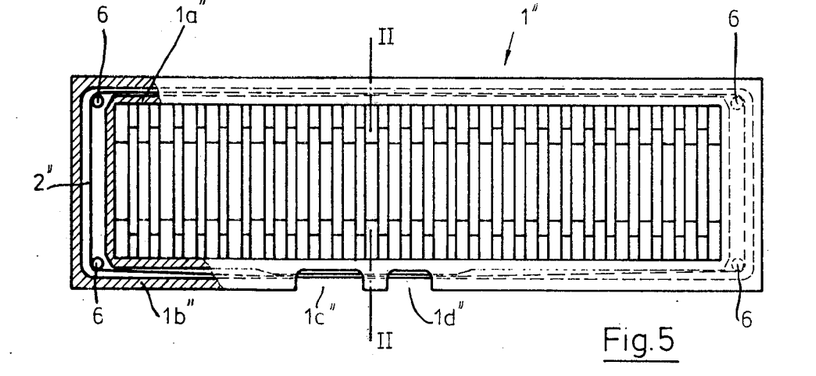
FIG. 5 shows another embodiment of a magazine, the container for receiving slides being located within the chamber receiving the sound carrier.

According to another embodiment of the magazine for simultaneous picture and sound reproduction, shown in FIG. 5, the container 1a'' receiving the slides is inserted as a whole into a trough-like container 1b''. The gap between the containers serves to receive and guide the sound carrier 2'' which is formed, similarly to the embodiments described above, as an endless belt and is guided on a plurality of fixed pins or rotatable rollers 6 provided at the corners of the receiving container. As already shown in FIG. 5, it has been possible, whilst simultaneously reducing the outer dimensions of the magazine, to obtain a considerable increase in the recording length of the sound carrier, in that said sound carrier is guided around a large core formed by the slide container. In the same manner as in the above-described embodiment, the magazine shown in FIG. 5 is provided with slot-like openings 1c'' and 1d'' to enable a feed roller 4 and a sound head 5 to be brought into contact with the scund carrier 2''. As may be seen more particularly from the cross-sectional view shown in FIG. 6, both containers 1a'' and 1b'' may be combined to form a closed unit comprising the sound carrier 2''.

Figure 6:
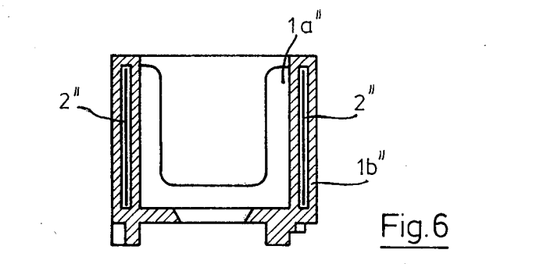
FIG. 6 shows a cross-section through the magazine taken on the line II—II of FIG. 5.
Figure 7:
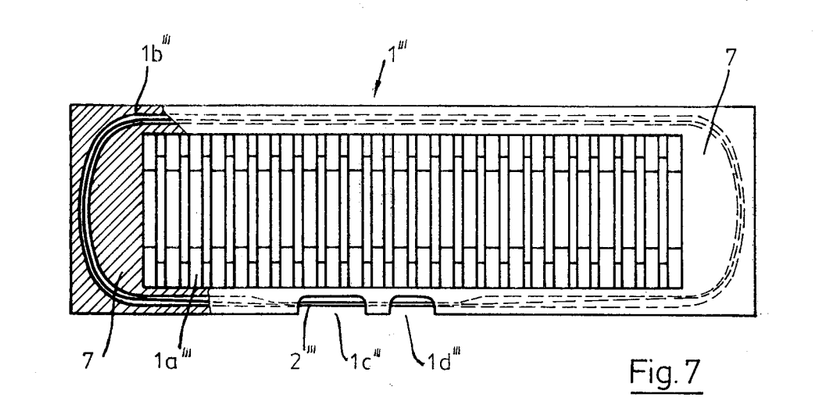
FIG. 7 shows a variant of the magazine of FIG. 5, in which the slide receiving container forms a core for guiding the sound carrier.

In a different embodiment (FIG. 7) of the magazine shown in FIGS. 5 and 6, the container 1a''' serving to receive the slides is provided at both ends with an end piece 7 in order to form a core with direct contact between the sound carrier 2''' and the slide container 1a''', which is inserted in a trough-like container 1b''' in the same manner as in the embodiment of FIG. 5. Slots 1c''' and 1d''' are formed in the side walls in order to enable a feed roller 4 and a sound head 5 to be brought into contact with the sound carrier 2'''.

Figure 8:
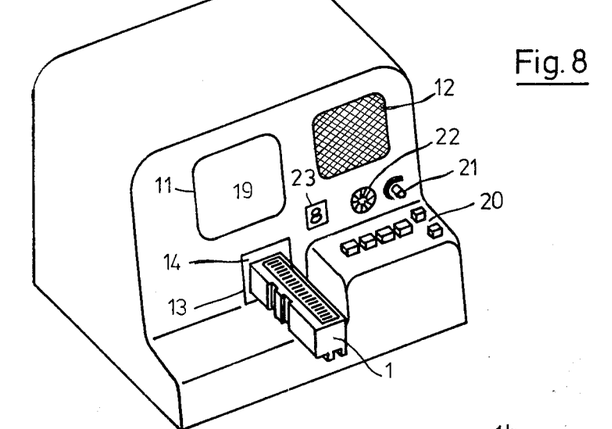
FIG. 8 is a perspective view of an apparatus for the simultaneous reproduction of the picture and sound recordings stored in a magazine.
Figure 9:
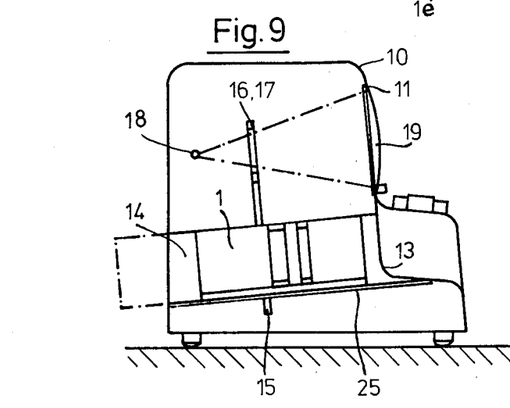
FIG. 9 is a schematic longitudinal section through the apparatus of FIG. 8 on a plane passing through the channel provided for receiving and guiding the magazine.
Figure 10:
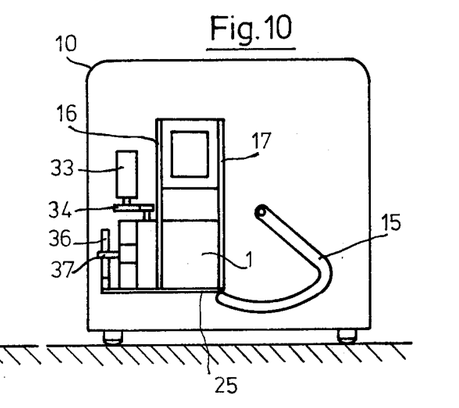
FIG. 10 shows a cross-section through the apparatus, showing a schematic view of the device for the insertion of a slide into the image frame, including an additional device comprising a sound head and a feed roller.
Figure 11:
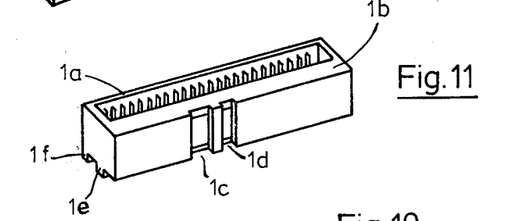
FIG. 11 shows a magazine which is provided with slide and sound carriers, suitable for use in the apparatus shown in FIGS. 8 to 10.

In FIGS. 8 – 10 a projection and sound reproduction apparatus is shown schematically. The design is suitable for the reproduction of the optical and acoustic information stored in magazines of the above-described type. This apparatus, of which for clarity only the essential technical details necessary for understanding the construction and function thereof are shown, comprises a housing 10, the front of which is provided with openings 11 and 12 for units for the reproduction of pictures and sound. In addition, the front comprises an opening 13, which, as shown in FIG. 8, defines a magazine-receiving and guide channel 14 which is formed so that the magazine 1, inserted from the front, can pass out at the rear of the apparatus. A conventional feed device, indicated symbolically in FIGS. 9 and 10 by the feed lever 15, is located near the receiving and guide channel 14. This lever feeds a slide, which has reached the reproduction position, to the picture frame formed by the two guide ledges 16 and 17, by a lifting movement. A lamp 18 is arranged so that the pictorial representation of the slide, as shown by chaindotted lines in FIG. 9, appears on the matt screen 19 provided across the opening 11.

As may be seen more particularly from FIG. 8, the picture and sound production apparatus is also provided with a push button panel 20, by means of which the switching on and off, the step-by-step operation of the magazine, the return of the additional device described in greater detail hereinafter, and so on, can be effected. In addition, the front of the apparatus is provided with a control knob 21 for regulating the volume of a loud speaker provided near the opening 12. Located behind an aperture 22 is a microphone, whilst a number appears in a window 23 and indicates which of the slides is next to come into the projection position.

Figure 12:
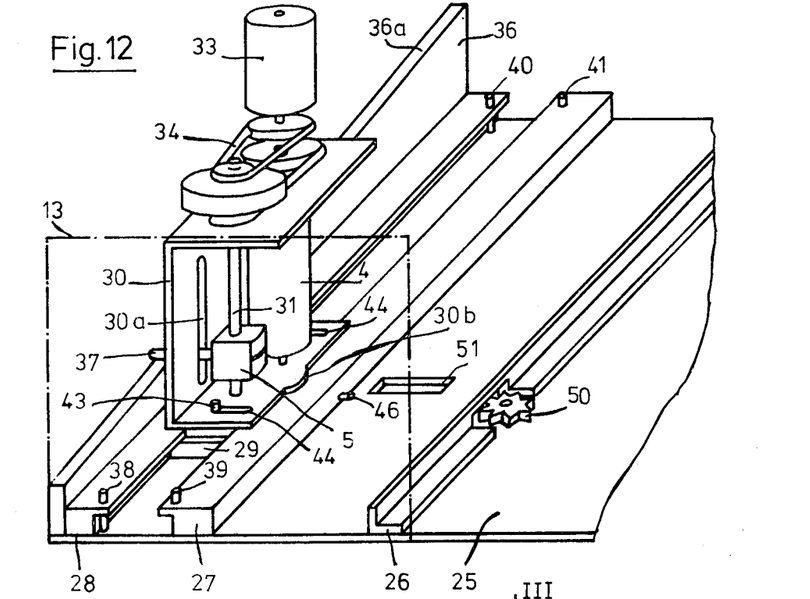
FIG. 12 shows a perspective view of an accessory assembly including a motor drive for the sound carrier and sound head, and control means for the sound head.

FIG. 12 shows that the projection apparatus is provided with a base surface 25 on which parallel ledges 26, 27 and 28 are secured, to guide a magazine inserted in the apparatus in a straight line and for guiding an additional device described in greater detail hereinafter. A shoe 29 reciprocates between the two guide ledges 27 and 28. Resting on the shoe 29 is an approximately U-shaped chassis 30 on which the feed roller 4 is journalled to rotate, as also the sound head 5, which is vertically displaceably and slidably guided by means of a guide bar 31. For the drive of the feed roller 4, the chassis 30 carries a motor 33, the driving shaft of which is in driving engagement with the axle of the feed roller 4 by means of a belt reduction gear 34. In order to obtain positive vertical displacement of the sound head 5, dependently on the advance of the shoe 29 carrying the chassis 30, a cam 36 is used, as shown in FIG. 12, which has an obliquely rising cam edge 36a. A lifting pin 37 secured to the sound head 5 and in turn guided in a slot 30a extending parallel to the guide rod 31, is slidable on the cam edge 36a.

The pitch of the edge 36a is such that, when the shoe 29 moves out of the starting position against two limiting stops 38 and 39, it moves until it strikes against the two end stops 40 and 41 and hence traverses a path which extends transversely to the direction of displacement of the slide, the amount of displacement corresponding to the width of the tape of the sound carrier accommodated in the magazine 1. Remembering that the magazine 1 containing the slides is always advanced step-by-step, this means that, dependently on this intermittent advance of the magazine, the sound head, located at the level of a particular sound track, is always moved forward by a corresponding amount, i. e., is set opposite to the next one of the recorded sound tracks. If it is assumed that the sound head 5 is in the starting position shown in FIG. 13, on the first sound track which is associated with the slide which is inserted first into the picture frame of the projection apparatus, it follows that, when the first step is completed, the sound head is placed opposite the second sound track which is associated with the second slide in the magazine. Thus the stepping of the sound head 5 is effected synchronously with the advance of the magazine 1 until the last slide in the magazine has reached the position for insertion into the picture frame, the sound head 5 at that time being located opposite the outermost sound track, associated with this slide.

The chassis 30, the component of the above-described unit and the accessory assembly comprising the drive of the sound carrier and the sound head 5, is mounted so as to be transversely displaceable on the slide 29. For this purpose, pin and slot guides 43, 44, are used, which permit a deflection of the accessory assembly upon the insertion of a magazine in the direction of the arrow indicated in FIG. 13 against the action of a return spring 45. Due to this deflecting movement, both the feed roller 4 and the sound head 5 are shifted laterally out of the actual plane of movement of the magazine until the accessory assembly and the magazine reach a position enabling their operation. In this position, as shown more particularly in FIG. 4, the feed roller 4 assumes a position coinciding with the slot 1c, and the sound head 5 a position coinciding with the slot 1d.

Figures 13, 14:
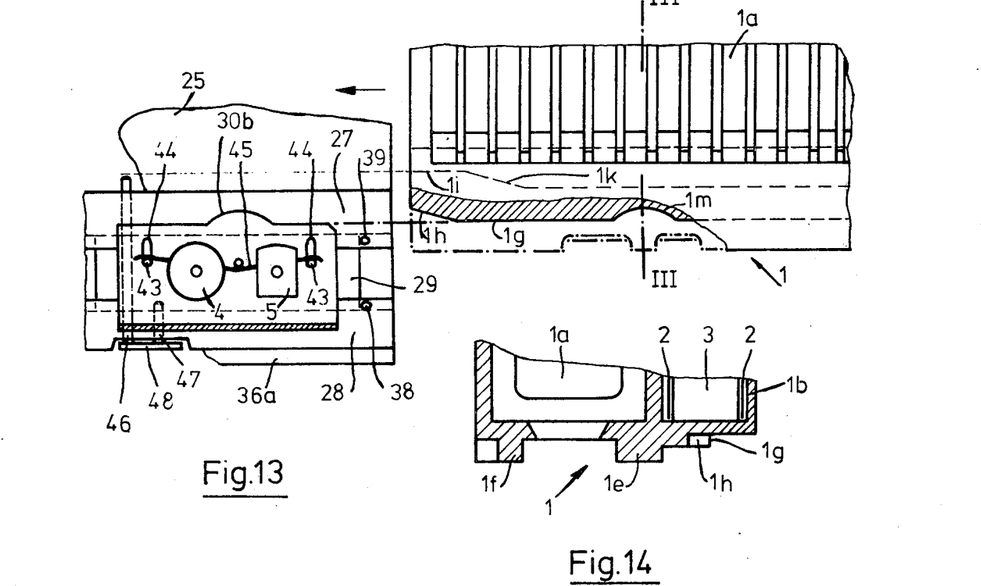
FIG. 13 is a plan view of the accessory assembly of FIG. 12 in its locked starting position, together with a magazine, the direction of insertion thereof being indicated by an arrow, the planes of movement of the edges of the magazine exerting a displacement function during the insertion of the device, being shown in dotted connecting lines and, finally.
FIG. 14 shows a cross-section through the magazine, taken on the line III—III of FIG. 13.

In order to achieve a positive lateral displacement of the accessory assembly when a magazine is inserted into the apparatus, there is a cam-like projection 30b, as shown particularly in FIGS. 13 and 14, on the lower bearing plate of the chassis 30, on which a cam-edge 1g formed on the magazine 1 acts, provided on a portion leading in the direction of movement with an inclined displacement edge 1b, as also shown in FIG. 13. In the starting position of the accessory assembly, the assembly is held by means of a locking bar comprising an actuating pin 46, axially displaceable in the lower part of the ledges 27 and 28, and a bar 48 secured to the pin 46 and carrying at the other end of a locking pin 47. The locking pin 47, participating always in the movement of the actuating pin 46, engages, in the starting position of the assembly, in an opening (not shown) formed in the slide 29 and thus locks the assembly. This locking action is necessary because when a magazine is inserted the assembly is intended to receive the thrust component of the pressure force extending in the longitudinal direction of the slide guide, whilst retaining a basic position, to prevent displacement of the assembly out of the starting position. An unlocking edge 1i, provided on the magazine 1, co-operates with the locking bar 46–48 or the actuating pin 46, the course of the said edge being such, as shown in chain-dotted lines in FIG. 13, that a displacement of the magazine relatively to the assembly finally produces the displacement of this pin 46 by the action of an inclined portion 1k of the edge. Unlocking is effected after the traverse of a certain path which enables the projection 30b to enter, under the action of the return spring 45, a concave recess 1m formed in the magazine. When this takes place, a frictional connection of the magazine and accessory assembly results, whilst, due to the simultaneous actuation of the locking bar 46 – 48, the assembly is released for a step-by-step displacement together with the magazine. The magazine and assembly then require only to be moved further into the magazine-receiving passage 14 until the teeth provided on the magazine are brought into engagement with the driving pinion 50, which then provides an intermittent feed, the first slide being simultaneously brought into a position from which it can be fed to the projection frame 16, 17 by means of the feed lever 15 extending through the slot 51. The intermittent advance of the slide magazine can be continued, after the projection of the first slide, until the accessory assembly runs against the limiting stops 40 and 41. A limit switch (not shown), is provided for interrupting the conventional drive for the intermittent advance of the magazine. In addition, a device operated menually or by a motor may be provided effecting the return of the accessory assembly and the used magazine to the starting position.

Manipulation of the above-described magazine and mode of operation of the apparatus is as follows:

For the reproduction of picture and sound recordings, the magazine 1, as shown in FIG. 8, is inserted in the receiving and guide channel of the apparatus and the insertion movement continued until the coupling connection between the magazine and the chassis 30 is established, and the driving engagement with the pinion 50. It is then only necessary to actuate the switches on the control panel 20 starting the operation of the apparatus, whereupon the lamp 18 is switched on and the first slide is fed to the picture frame 16, 17. When the slide has reached the projection position, the sound carrier is set in movement by the conveyor roller 4, and the sound record associated with the first slide is played. After a complete rotation of the sound carrier a tab secured thereto momentarily interrupts the supply of current to the driving motor 33 of the accessory assembly. As already known, the return of the slide to the magazine follows. By depressing a feed button for the magazine the next slide is fed to the picture frame after an intermittent advance of the magazine, and the sound head automatically set to that of the associated sound track. This cycle is repeated until the last slide in the magazine is brought to the viewing position and the associated sound track is played. The magazine is then returned to the starting position either by a manually or motor operated return device, after which it can be removed from the projection apparatus.

What is claimed is:

1. Self-contained, portable compact composite longitudinal magazine carrier for use in the projection of diapositives with simultaneous concordant reproduction of associated sound upon intermittent stepwise advancement of the magazine carrier along a longitudinal path in a projection and sound reproduction apparatus, which comprises:

a longitudinal picture slide magazine portion provided with means defining a plurality of compartments in tandem longitudinally for operatively receiving diapositives respectively in generally parallel arrangement in a stored position therein for individual movement from such stored position to a projection position in accordance with such stepwise advancement, and a longitudinal sound tape container portion provided with an endless sound carrier means formed as a separate longitudinally extending endless tape and guided for movement along an endless path for carrying a plurality of endless sound tracks with each sound track corresponding to a dispositive so that upon projection of the respective diapositives the associated sound of a corresponding sound track is reproduced, said endless tape being operatively disposed for corresponding selective simultaneous operative engagement with a sound head of such sound reproduction apparatus and associated drive means to drive the endless tape for sound reproduction via such sound head during such movement along said endless path when a diapositive is in projection position at a corresponding intermittent step of such stepwise advancement, and said magazine portion and tape container portion being provided as a portable compact composite unit for common stepwise advancement along the longitudinal path.

2. Carrier according to claim 1 wherein the magazine portion and tape container portion as provided in longitudinally extending side by side relation, and the tape container portion is formed as a substantially closed tape chamber having access opening means for operatively exposing the endless tape for such engagement with the sound head of the sound reproduction apparatus and associated drive means.

3. Carrier according to claim 2 wherein means including an elongated core member are provided in the tape chamber for guiding the endless tape along said endless path peripherally about such core member.

4. Carrier according to claim 1 wherein the tape container portion is formed as an outer tape chamber having a central space and the magazine portion is formed as an inner magazine chamber operatively disposed in the central space of the tape chamber to define an intermediate longitudinally extending endless guide slot operatively between the adjacent portions of the inner and outer chambers for guiding the endless tape therealong, the outer tape chamber having access opening means for operatively exposing the endless tape for such engagement with the sound head of the sound reproduction apparatus and associated drive means.

5. Carrier according to claim 4 wherein roller means are provided in the intermediate endless guide slot and the endless tape is operatively mounted thereon.

6. Carrier according to claim 4 wherein the corresponding longitudinal end portions of the inner chamber defining the intermediate endless guide slot are curved for guiding the endless tape peripherally therealong.

7. Projection and sound reproduction apparatus, adapted to accommodate a self-contained, portable compact composite longitudinal magazine carrier having a picture slide magazine operatively receiving a plurality of diapositives and an endless sound tape mounted for movement along an endless path and carrying a plurality of endless sound tracks transversely side by side thereon with each sound track corresponding to a diapositives so that upon projection of a diapositive the associated sound track is simultaneously reproduced which comprises means for intermittent stepwise advancement of such a magazine carrier along a longitudinal advancement path to pass a projection station, means at the projection station adjacent to the path for selective movement of a corresponding diapositive from the magazine of the magazine carrier to a projection position at a corresponding intermittent step of such stepwise advancement for projecting the diapositive for viewing, an accessory assembly including cooperating drive means for driving the endless tape in any position of advancement of the magazine carrier and a sound head for concordant reproduction of associated sound from the endless tape, and means to displace the sound head transversely with respect to the path and in turn with respect to the plurality of endless sound tracks in dependence upon the position of advancement of the magazine carrier along the path, for corresponding selective simultaneous operative engagement of the drive means and the sound head with the endless sound tape for driving the endless tape and for concordant reproduction of associated sound from a corresponding sound track at the point of transverse displacement of the sound head when a diapositive is in the projection position at a corresponding intermittent step of the stepwise advancement.

8. Apparatus according to claim 7 wherein the accessory assembly is mounted for advancement along the path together with the magazine carrier, and a control cam having an inclined guide edge extends operatively along the advancement path for engaging the sound head for displacing the sound head transversely with respect to the path and in turn with respect to the sound tracks in dependence upon the position of advancement of the magazine carrier.

9. Apparatus according to claim 8 wherein means are provided for releasably automatically couplingly inserting the magazine carrier on the accessory assembly for advancement along the path, said accessory assembly being mounted for lateral deflection of the drive means and sound head with respect to the path for unhindered releasable insertion of the carrier thereon.

10. Apparatus according to claim 9 wherein means are provided for advancement of the magazine carrier along the path operatively from an initial position to a final position and for automatic return of the magazine carrier to the initial position after reaching the final position.

11. Projection and sound reproduction apparatus and a magazine carrier therefor, which comprises in combination a self-contained, portable compact composite longitudinal magazine carrier for projection of diapositives with simultaneous concordant reproduction of associated sound upon intermittent stepwise advancement of the magazine carrier along a longitudinal path in the projection and sound reproduction apparatus, said magazine carrier including a longitudinal picture slide magazine portion provided with means defining a plurality of compartments in tandem longitudinally for operatively receiving diapositives respectively in generally parallel arrangement in a stored position therein for individual movement from such stored position to a projection position in accordance with such stepwise advancement, said magazine carrier further including a longitudinal sound tape container portion provided with an endless sound carrier means formed as a separate longitudinally extending endless tape and guided for movement along an endless path for carrying a plurality of endless sound tracks with each sound track corresponding to a diapositive so that upon projection of the respective diapositives the associated sound of a corresponding sound track is simultaneously reproduced, said endless tape being operatively disposed for corresponding selective simultaneous operative engagement with a sound head of the sound reproduction apparatus and associated drive means to drive the endless tape for sound reproduction via such sound head during such movement along said endless path when a dispositive is in projection position at a corresponding intermittent step of such stepwise advancement, said magazine portion and tape container portion being provided as a portable compact composite unit for common stepwise advancement along the longitudinal path, means for intermittent stepwise advancement of the magazine carrier along the longitudinal advancement path to pass a projection station in the projection and sound reproduction apparatus, means at the projection station adjacent to the path for selective movement of a corresponding diapositive from the magazine portion of the magazine carrier to the projection position at a corresponding intermediate step of the stepwise advancement for projecting the diapositive for viewing, drive means for driving the endless tape in any position of advancement of the magazine carrier, a sound head for concordant reproduction of associated sound from the endless tape, and means to displace the sound head transversely with respect to the plurality of endless sound tracks in dependence upon the position of advancement of the magazine carrier along the path, said drive means and sound head being operatively arranged with respect to the endless tape for corresponding selective simultaneous operative engagement of the drive means and the sound head with the endless sound tape for driving the endless tape and for concordant reproduction of associated sound from a corresponding sound track at the point of transverse displacement of the sound head when a diapositive is in the projection position at a corresponding intermittent step of the stepwise advancement.

12. Combination according to claim 11 wherein the drive means for driving the endless sound tape and the sound head for concordant reproduction of associated sound from the endless tape are providing in the form of an accessory assembly mounted for advancement along the path together with the magazine carrier, and a control cam having an inclined guide edge extends operatively along the advancement path for engaging the sound head for displacing the sound head transversely with respect to the path and in turn with respect to the sound tracks in dependence upon the position of advancement of the magazine carrier.

13. Combination according to claim 12 wherein means are provided for releasably automatically couplingly inserting the magazine carrier on the accessory assembly for simultaneous advancement along the path, said accessory assembly being mounted for lateral deflection of the drive means and sound head with respect to the path for unhindered releasable insertion of the carrier thereon.

14. Combination according to claim 12 wherein the magazine portion and tape container portion of the magazine carrier are provided in longitudinally extending side by side relation, and the tape container portion is formed as a substantially closed tape chamber having access opening means for operatively exposing the endless tape for such engagement with the sound head and the drive means.

15. Combination according to claim 12 wherein the tape container portion of the magazine carrier is formed as an outer tape chamber having a central space and the magazine portion of the magazine carrier is formed as an inner magazine chamber operatively disposed in the central space of the tape chamber to define an intermediate endless guide slot operatively between the adjacent portions of the inner and outer chambers for guiding the endless tape therealong, the outer tape chamber having access opening means for operatively exposing the endless tape for such engagement with the sound head and drive means.

* * * * *